United States Patent [19]
Walker et al.

[11] Patent Number: 5,216,755
[45] Date of Patent: Jun. 1, 1993

[54] VIDEO IMAGE CREATION SYSTEM WHICH PROPORTIONALLY MIXES PREVIOUSLY CREATED IMAGE PIXEL DATA WITH CURRENTLY CREATED DATA

[75] Inventors: Ian C. Walker, Newbury; Richard J. Taylor, London; Anthony D. Searby; Paul R. N. Kellar, both of Newbury, all of England

[73] Assignee: Quantel Limited, Newbury, England

[21] Appl. No.: 723,728

[22] Filed: Jun. 20, 1991

Related U.S. Application Data

[63] Continuation of Ser. No. 444,776, Dec. 1, 1989, abandoned, which is a continuation of Ser. No. 211,064, Jun. 20, 1988, abandoned, which is a continuation of Ser. No. 947,096, Dec. 29, 1986, abandoned, which is a continuation of Ser. No. 761,305, Jul. 29, 1985, Pat. No. 4,633,416, which is a continuation of Ser. No. 641,544, Aug. 17, 1984, abandoned, which is a continuation of Ser. No. 326,293, Dec. 1, 1981, Pat. No. 4,514,818.

[30] Foreign Application Priority Data

Dec. 4, 1980 [GB] United Kingdom ............ 8038887

[51] Int. Cl.$^5$ .................................... G06F 15/00
[52] U.S. Cl. ............................ 395/132; 340/521; 340/703; 340/710; 340/798
[58] Field of Search ............... 364/521; 178/18; 358/22, 903; 340/703, 706, 707, 708, 710, 725, 728, 751, 798, 521; 395/132

[56] References Cited

U.S. PATENT DOCUMENTS

| | | |
|---|---|---|
| 1,360,085 | 11/1920 | Bradley . |
| 2,565,912 | 11/1949 | Davis . |
| 3,192,315 | 6/1965 | Remley . |
| 3,441,722 | 4/1969 | Gloess ............................ 235/151 |
| 3,672,742 | 6/1972 | Barg . |
| 3,673,579 | 6/1972 | Graven ............................ 340/173 |
| 3,832,485 | 8/1974 | Pieters ............................ 178/6.8 |
| 3,835,245 | 9/1974 | Pieters ............................ 178/6.8 |
| 3,846,826 | 11/1974 | Mueller .......................... 340/751 X |
| 3,936,636 | 2/1976 | Percival . |
| 3,944,988 | 3/1976 | Mayer ............................ 340/172.5 |

(List continued on next page.)

FOREIGN PATENT DOCUMENTS

| | | |
|---|---|---|
| 1178330 | 1/1970 | United Kingdom . |
| 1226559 | 9/1971 | United Kingdom . |
| 1343298 | 1/1974 | United Kingdom . |
| 1404672 | 8/1975 | United Kingdom . |

(List continued on next page.)

*Primary Examiner*—Dale M. Shaw
*Assistant Examiner*—Laura Brütman
*Attorney, Agent, or Firm*—Cooper & Dunham

[57] ABSTRACT

Video image creation in which a raster-scan monitor displays an image comprising realistic, inherently non-aliased strokes created by combining proportions of the values of: (i) pixels defining a simulated brush moving along the image as an artist moves a pen on a tablet in continuous strokes; and (ii) the values of the pixels in the image that are under the brush at the time. The pixel values resulting from such combining replace the corresponding pixel values in the image so that, after an initial portion of a stroke, the pixel values in the image which are under the brush and therefore will be combined with the brush values comprise pixel values which are the cumulative result of a number of previous such combining operations. Manual pressure on the pen controls the proportions used in such combining operations. As the artist presses harder on the pen, the effect seen on the monitor is that more "paint" is applied. Image creation takes place substantially in real time, to retain the feel of conventional drawing or painting while providing the benefits of the electronic medium. The brush position on the image can be defined to sub-pixel resolution to improve the process. In an air brush mode, dwell time rather than movement of the pen initiates new pixel value combining operations.

64 Claims, 11 Drawing Sheets

U.S. PATENT DOCUMENTS

| | | |
|---|---|---|
| 3,978,280 | 8/1976 | Kavanagh et al. ............... 178/6.8 |
| 4,017,680 | 4/1977 | Anderson et al. ............... 358/242 |
| 4,028,727 | 6/1977 | Skrydstrup . |
| 4,070,710 | 1/1978 | Sukonick et al. ............... 364/900 |
| 4,103,331 | 7/1978 | Thacker ............... 340/706 X |
| 4,129,747 | 12/1978 | Pepper, Jr. ............... 178/19 |
| 4,146,788 | 3/1979 | Mirkin et al. ............... 250/311 |
| 4,148,070 | 4/1979 | Taylor . |
| 4,156,237 | 5/1979 | Okada et al. ............... 340/701 |
| 4,172,264 | 10/1979 | Taylor et al. . |
| 4,189,743 | 2/1980 | Schure et al. ............... 340/707 X |
| 4,189,744 | 2/1980 | Stern . |
| 4,198,539 | 4/1980 | Pepper, Jr. ............... 178/18 |
| 4,200,867 | 4/1980 | Hill ............... 340/703 |
| 4,232,311 | 11/1980 | Agneta . |
| 4,240,104 | 12/1980 | Taylor et al. . |
| 4,240,106 | 12/1980 | Michael et al. ............... 358/36 |
| 4,250,522 | 2/1981 | Seki et al. . |
| 4,258,385 | 3/1981 | Greenberg et al. ............... 358/22 |
| 4,261,040 | 4/1981 | Weidman et al. ............... 364/554 |
| 4,280,138 | 7/1981 | Stock ............... 358/150 |
| 4,286,291 | 8/1981 | Taylor et al. . |
| 4,292,649 | 9/1981 | Macheboeuf ............... 358/22 |
| 4,293,734 | 10/1981 | Pepper, Jr. ............... 178/18 |
| 4,302,011 | 11/1981 | Pepper, Jr. ............... 273/85 G |
| 4,318,096 | 3/1982 | Thornburg et al. . |
| 4,329,710 | 5/1982 | Taylor . |
| 4,334,245 | 6/1982 | Michael . |
| 4,345,313 | 8/1982 | Knox ............... 364/515 |
| 4,355,805 | 10/1982 | Baer et al. ............... 273/85 G |
| 4,357,624 | 11/1982 | Greenberg . |
| 4,360,831 | 11/1982 | Kellar ............... 358/183 |
| 4,384,338 | 5/1983 | Bennett . |
| 4,418,390 | 11/1983 | Smith et al. . |
| 4,433,330 | 2/1984 | Furjanic ............... 340/750 |
| 4,459,677 | 7/1984 | Porter et al. ............... 364/90 C |
| 4,475,161 | 10/1984 | Stock ............... 364/521 |
| 4,514,818 | 4/1985 | Walker ............... 364/521 |
| 4,521,770 | 6/1985 | Rhyne ............... 340/703 |
| 4,524,421 | 6/1985 | Searby et al. ............... 364/521 |
| 4,564,915 | 1/1986 | Evans et al. ............... 364/521 |
| 4,602,286 | 7/1986 | Kellar et al. ............... 358/183 |
| 4,613,249 | 7/1986 | Michael et al. . |
| 4,633,416 | 12/1986 | Walker ............... 364/521 |

FOREIGN PATENT DOCUMENTS

| | | |
|---|---|---|
| 1515506 | 6/1978 | United Kingdom . |
| 1517313 | 7/1978 | United Kingdom . |
| 1522375 | 8/1978 | United Kingdom . |
| 1542415 | 3/1979 | United Kingdom . |
| 1548385 | 7/1979 | United Kingdom . |
| 2032217 | 4/1980 | United Kingdom . |
| 1570773 | 7/1980 | United Kingdom . |
| 1574173 | 9/1980 | United Kingdom . |
| 1579828 | 11/1980 | United Kingdom . |
| 2055027 | 2/1981 | United Kingdom . |
| 1586169 | 3/1981 | United Kingdom . |
| 2062396 | 5/1981 | United Kingdom . |
| 2092346 | 2/1982 | United Kingdom . |
| 2089625 | 9/1982 | United Kingdom . |
| 2117996 | 6/1983 | United Kingdom . |
| 2109193 | 7/1983 | United Kingdom . |

OTHER PUBLICATIONS

Rivlin, *History and Basic Concepts of Computer Graphics*, Chapter 4, "The Digital Canvas, 2-D Animation and Paint and Programs", 1988.

*Broadcast Management and Engineering*, "NAB Show in Print . . . " Jun., 1981, pp. 57–58.

Catmull, E., Computer Graphics, vol. 12, No. 3, "The Problems of computer Assisted Animation", Aug. 1978, pp. 495–499.

Leonard E., *Society of Motion Picture and Television Engineers Journal*, vol. 87, 1978, pp. 499–504.

Bresenham, J., *IBM Systems Journal*, vol. 4, No. 1, "Algorithm for Computer Control of a Digital Plotter", 1965, pp. 25–30.

Regnier, H. et al., *Proceedings, International Broadcasting Convention*, "Inactive Computer Graphics In Broadcast Environment", 1978.

Shoup, R., *Digital Video*, "Some Experiments in TV Graphics and Animation Using a Digital Image Memory" Mar. 1979, p. 8.

Stern, G., "Soft Cel-An Application of a Raster Scan Graphics to Conventional Cel Animation, 1979.

Catmull, F., "Computer Animation-The State of the Art", 1980.

Levoy, M. "The Design and Implementation of a Large Scale Computer Assisted Cartoon Animation Productions System", 1980.

Levoy, M., "Frame Buffer Configurations for Paint Programs", 1980.

Crow, F., IEEE CG&A, "A Comperison of Anti--Aliasing Techniques" Jan. 1981, pp. 40–48.

(List continued on next page.)

OTHER PUBLICATIONS

Gupta, S., et al., *Computer Graphics* "Filtering Edges for Gray Scale Displays", Aug. 1981, 1981, pp. 1–5.

Kajiya, T. et al., *Computer Graphics*, vol. 15, No. 3, "Filtering High Quality Text for Display on Raster Scan Devices", Aug. 1981, pp. 7–15.

Leedom, B. *International Broadcast Engineer*, vol. 12, "Ava-Ampev Video Art", Jul. 1981, pp. 8–10.

Tanton, N., *International Broadcast Engineer*, vol. 12, No. 178, A Microprocessor-Based Tool for Graphic Design", Jul. 1981, pp. 12–13.

Catmull, E., *American Cinematographer*, "New Frontiers in Computer Animation", pp. 1000 et seq., Oct. 1979.

Barros, J. et al., "Generating Smooth 2-D Monocolor Line Drawings on Video Display"; 1979.

Forrest, A., "On the Rendering of Surfaces", 1979.

Feibush, E. et al., "Synthetic Texturing Using Digital Filters", 1980.

Forrest, A., *NATO ASI Series, Fundamental Alaithms for Computer Graphics*, "Anti-Aliasing in Practice, 1985, pp. 113–134.

Strassman, S., *Computer Graphics*, vol. 20, No. 4, "Hairy Brushes pp. 225–232 (1986).

Crow, F., *State of the Art in Computer Graphics*, "Anti-Aliasing", 1988.

vol. 17, No. 3, "Edge Interference with Applications to Anti-Aliasing", Jul. 1983, pp. 157–162.

Black, P., "Broadcast Management and Engineering, Digital Art/Paint Systems Are They Right For You?", Feb. 1982, pp. 67–74.

Borell, J. *Computer Graphics World*, "Digital Paint-Systems", Apr. 1982, pp. 61–67.

Wittea, T. *Computer Graphics*, vol. 17, No. 3 "Anti-Aliased Line Drawing Using Brush Extrusion", Jul. 1983, pp. 151–156.

Lewis T. P., *Computer Graphics*, vol. 18, No. 3, "Textured Synthesis for Digital Painting", Jul. 1984, pp. 245–252.

Catmull, E., Computers for Image Making, "Computer Character Animation—Is It Possible", pp. 64–69.

*Quantel Limited v Shima Seiki Europe Limited*, Chancey Division, Patents Court, Dkt. No. CH 1989 Q No. 10727 (Affidavits of John Henry Zimet).

Lippke, J., *BME's World Broadcast News*, "Broadcasters Latest Tool: Digital Art Systems".

Robertson, B., *Computer Graphics World*, "Paint", Apr. 1988.

Waldman, C., *Star and Sky*, "Solar System Exploration by Computer Graphics", Mar. 1980, pp. 28–33.

Shoup, R. G., "Superpaint . . . The Digital Animator", *Datamation*, May 1979, 150–156.

Musgrave, J., "Experiments in computer-aided graphic expression", IEEE Trans. on Professional Communications, vol. PC-21, No. 3, Sep. 1978, 110–117.

Hubble, L. et al., "State of the art in image display systems", *Proc. Society Photo-Opt. Instrum. Eng.*, vol. 199, 1979, 2–8.

Scott, David, "Computerized paintbox speeds electronic art", *Popular Science*, Jun. 1984, 102–104.

Wise, J. L. et al., "Display controller simplifies design of sophisticated graphics terminals", *Electronics*, vol. 54, No. 7, Apr. 1981, 153–7.

Regnier, H. K. et al., "Practical Computer Graphics for Television", Conference: International Broadcasting Convention, Brighton, England, Sep. 1980, 20–23.

Stock, R., "Introduction to Digital Computer Graphics for Video", *SMPTE Journal*, vol. 90, No. 12, Dec. 1981.

INTELLECT, a new dimension in Image Processing and Synthesis, 14 pages (Micro Consultants Limited) Feb., 1976.

Appel, A. et al., *IBM Technical Disclosure Bulletin*, vol. 24, No. 4, Sep. 1981, pp. 2013–2016.

Crow, F. C. et al., *Computer*, "Shaded Computer Graphics in the Entertainment Industry", Mar. 1978.

Smith, A. R., "Tutorial: Computer Graphics", IEEE Computer Society, IEEE Inc., 1982, pp. 501–515.

*Quantel Limited v. Spaceward Microsystems*, High Court of Justice, Chancery Division, Patents Court, Dkt. No. CH 1987 Q No. 8156 (Transcripts of Testimony & Oral Arguments).

*Quantel Limited v. Spaceward Microsystems*, High Court of Justice Chancery Division, Patents Court, Dkt. No. CH 1987 Q No. 8156 (Litigation Documents).

VHS tape entitled "New York Institute of Technology computer graphics demonstration video".

VHS tape entitled "Ampex AVA demonstration video".

VHS tape entitled "NASA graphics demonstration video".

Fig.2.
(a) PRIOR ART
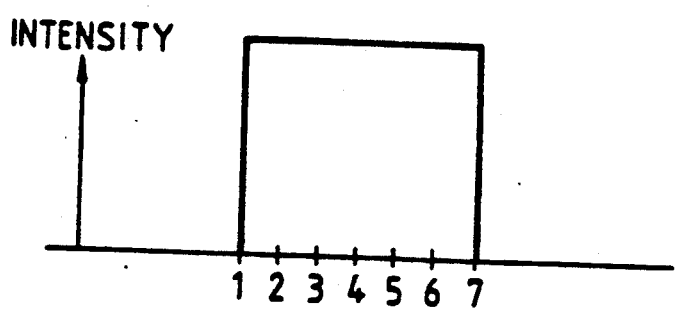
(b)
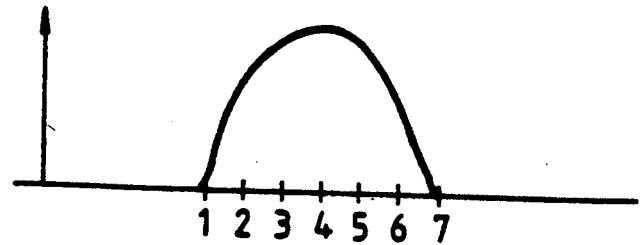

VIDEO IMAGE CREATION SYSTEM WHICH PROPORTIONALLY MIXES PREVIOUSLY CREATED IMAGE PIXEL DATA WITH CURRENTLY CREATED DATA

This is a continuation of application Ser. No. 07/444,776 filed Dec. 1, 1989, abandoned, which is a continuation of application Ser. No. 07/211,064 filed Jun. 20, 1988, abandoned, which is a continuation of application Ser. No. 06/947,096 filed Dec. 29, 1986, abandoned which is a continuation of application Ser. No. 06/761,305 filed Jul. 29, 1985, U.S. Pat. No. 4,633,416, which is a continuation of application Ser. No. 06/641,544 filed Aug. 17, 1984, abandoned, which is a continuation of application Ser. No. 06/326,293 filed Dec. 1, 1981, U.S. Pat. No. 4,514,818.

BACKGROUND OF THE INVENTION

The invention relates to the creation of video images.

There are a number of standard computer peripherals available that permit "computer graphics" to be generated entirely electronically. These can take the form of vector or raster displays with the input means usually some form of touch tablet on which the operation can draw and see the results of this work in real time on the electronic display.

The system of particular interest to the broadcaster, amongst other, is that of the raster display configuration where the display itself can take the form of a normal colour TV screen and thus the video from the computer can be broadcast directly. The obvious use of such a system is to allow the graphics used so much in modern productions to be generated electronically rather than the traditional pencil and paper or "cut and stick" techniques that are both time consuming and expensive in materials.

STATEMENT OF PRIOR ART

A typical known electronic graphics system is shown in FIG. 1 comprising a touch tablet 10, a computer 12, a framestore 13 with associated colour generation RAMs 14-16 for the display 17. An artist draws with the stylus 11 of the touch tablet and the computer 12 registers the coordinates (x, y) of the stylus whilst remembering the selected colour with which the artist has chosen to draw. The computer then feeds the appropriate addresses to the framestore 13 where the pixel at that address is modified to hold the code corresponding to the chosen colour which it receives as incoming data. As the framestore is read at normal broadcast video rates then the lines, or pictures, drawn by the artist are visible on the display. It is found in practice that, providing the display is directly in front of the touch tablet, the fact that the artist is not watching his hand but the screen provides no problem.

It is possible to use the computer to designate the stylus size so as to be several picture points in diameter for example so that the lines on the 'drawn' image will be of a designated width, as though drawn with a larger stylus. This is achieved by controlling the writing of data into the frame store so that adjacent picture points receive the incoming data also.

The colour for display is generated from the RAM stores 14-16 handling the Red, Green or Blue component respectively to generate the desired colour combination. (Equal amounts of R, G and B components will produce a monochrome image of a certain intensity.) If the data from frame store 13 is 8 bits wide, this will allow 256 different 'partial colour' combinations. The capacity of the RAMs is selected accordingly. The various colour parameters are fed into the RAMs from the computer and can be updated as desired. During normal operation the RAMs operate as ROMs in dependence on the frame store output.

Now the system described represents a fairly common application of digital techniques and there are already a number of such units available.

In the system as described, the path from the touch tablet to the framestore and the display via the computer is all unidirectional, since the computer only writes to the framestore and does not read from it (and in such a system makes no use of the information held in the framestore).

The type of pictures drawn with such a machine can be of very high quality but cannot fall into the category of "fine art", or, put another way, they are more impressionistic than realistic. This is caused by the nature of the hard "electronic" lines being a far cry from the textures and tonal qualities of the more conventional artists tools.

This electronic nature of the pictures is further emphasised by the fact that existing systems are 'partial' colour (as shown) systems rather than 'full' colour, that is to say, the framestore only has 256 possible combinations in each pixel and a colour can be allocated to each combination. Thus only 256 hues, saturations or luminance levels are possible on the screen for any given picture. Any true pictorial representation of a scene would have far more combinations than this.

OBJECT OF THE INVENTION

The system of the present invention seeks to arrive at a much closer electronic analogy of the normal artists tool in order that the operator might still move the stylus but that the results on the screen make it appear he is genuinely working with a pencil, paint brush, or other implement.

SUMMARY OF THE INVENTION

According to the invention there is provided a video image creation system comprising means for providing image data pertaining to at least one picture point allocated to a designated coordinate location and processing means for processing the image for each designated coordinate location from both current and previously derived image data.

BRIEF DESCRIPTION OF THE DRAWINGS

The invention will now be described by way of example with reference to the accompanying drawings, in which:

FIGS. 2a and 2b show a graphical comparison between the intensity of prior art arrangement and one of the considerations of the present invention.

DESCRIPTION OF PREFERRED EMBODIMENT

Figure 1:
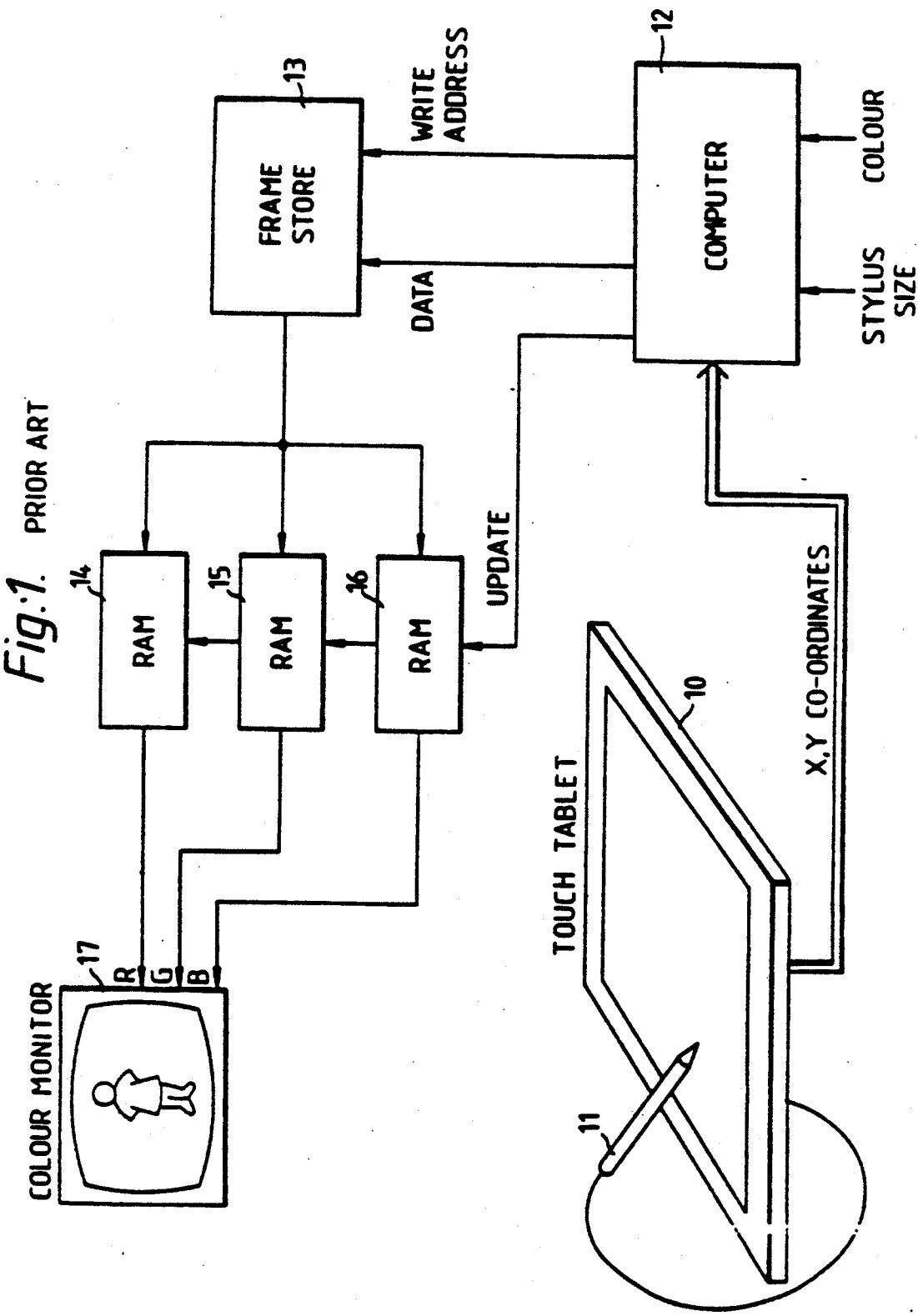
FIG. 1 shows a known picture creation system.

As already described with regard to the prior art arrangement of FIG. 1, such a prior art system can designate the stylus size but the resulting image drawn via this stylus is rather impressionistic due to the hard electronic lines. Considering this prior art system operating in black and white (monochrome) then assuming the stylus width to have been selected to be 7 picture points (centred on picture point 4) then the intensity will correspond to that shown in FIG. 2(a). In order to move towards a more natural image, the first consideration was to vary the intensity so that it was reduced towards the edges of the stylus as shown in FIG. 2(b). The shape was initially calculated by considering a cylinder projected onto a matrix of pixels. In the centre there is full intensity but at the edges where the cylinder only partially covers a pixel a correspondingly reduced intensity is used. Whilst this gives the correct softening effect to the edges to provide an improved image on a raster display, this only goes some way to overcoming the problem as the algorithm has no knowledge of the background and consequently produces a halo effect.

It has been found that in order to produce a more realistic image it is necessary to provide a contribution from the 'background' on which the image is drawn when synthesising this image. The background can correspond to the paper or can be part of the image already created. The reasons for this approach will now be described.

Considering the stylus as though it were a pencil which can simply be considered to be a point drawn across the paper to form lines. However on further investigation this was found to be only partially true since, the end of the pencil has a 'distribution' and this distribution varies whether it is a lead pencil, a coloured pencil, a crayon or charcoal or other implement. Thus, if a system is to be built that successfully emulates the artists tools, as the stylus is moved across the touch tablet, it must not just fill the pixels corresponding with its address with the appropriate colours, it must form a distribution around the point in question just as the real life pencil, crayon or charcoal does.

If the stylus is now considered as if it were a paint brush then further aspects need investigation, since the type of paint it is carrying also matters. A brush fully loaded with poster paint is very similar to the pencil situation since it simply replaces the colour of the paper with that of the paint according to a certain distribution. However, water colours and oil paint depend not only on what paint is loaded on the rush but also what paint is on the paper. The brushes still have distributions but not the simple type of the pencil that has one simple peak, the brush can have many peaks (the stripple), lines (the oil), or just a single peak (the traditional camel hair) but all have little or no temporal content.

Thus we have found that instead of having to write just one point or several points of equal value for each position of the stylus on the touch tablet, a distribution of luminance and chrominance levels have to be written around the point in question to simulate the action of the pencil or paint brush. At the extreme edge of the influence of the pencil there is a very small contribution from the pencil and a large contribution from the background whilst at the centre of the pencil, the contribution is nearly all from the pencil.

Figure 3:
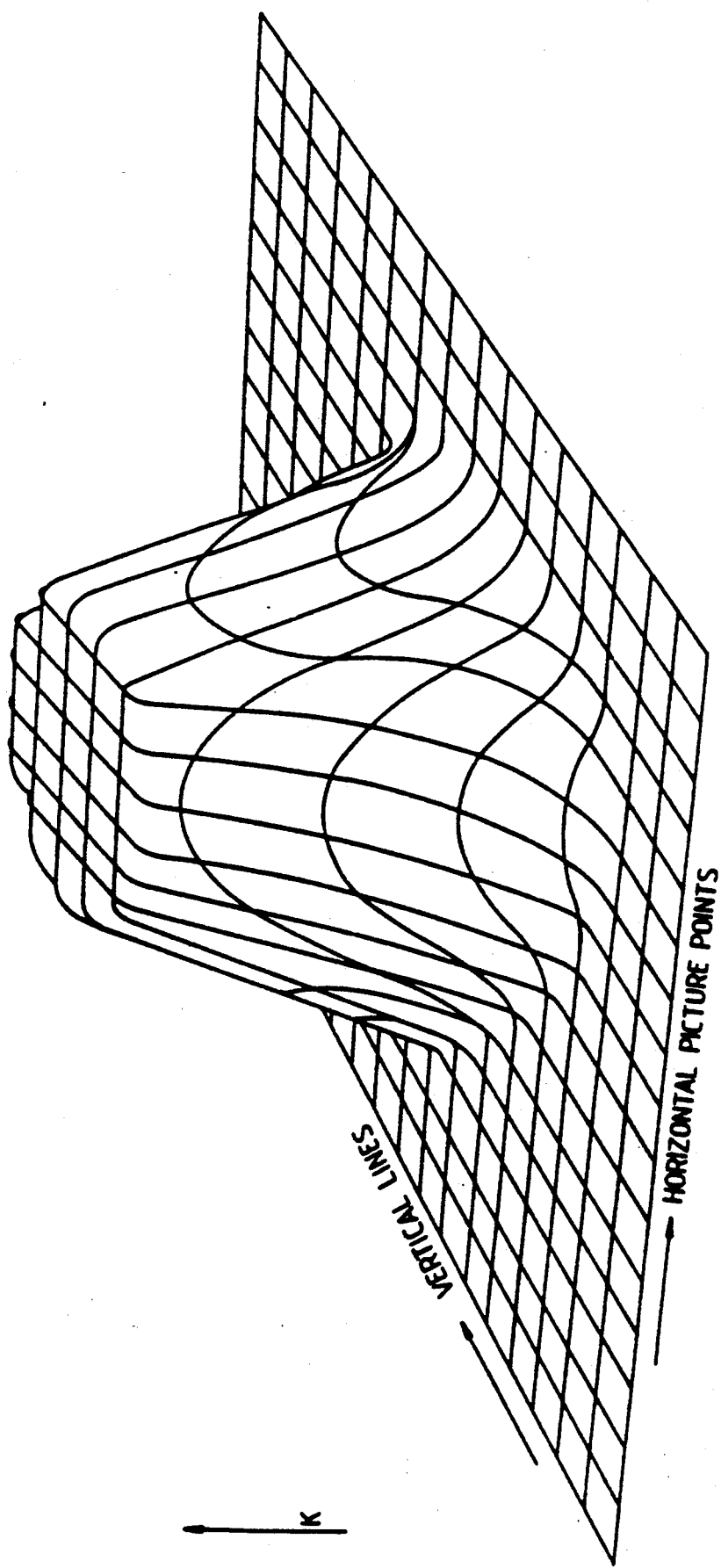
FIG. 3 shows an example of contribution from a pencil.

Considering FIG. 3, the small squares represent picture points and the vertical axis the contribution from the pencil. The curve shown could be typical for a broad pencil whereas FIG. 4 more accurately shows a narrow fine point pencil.

Figure 4:
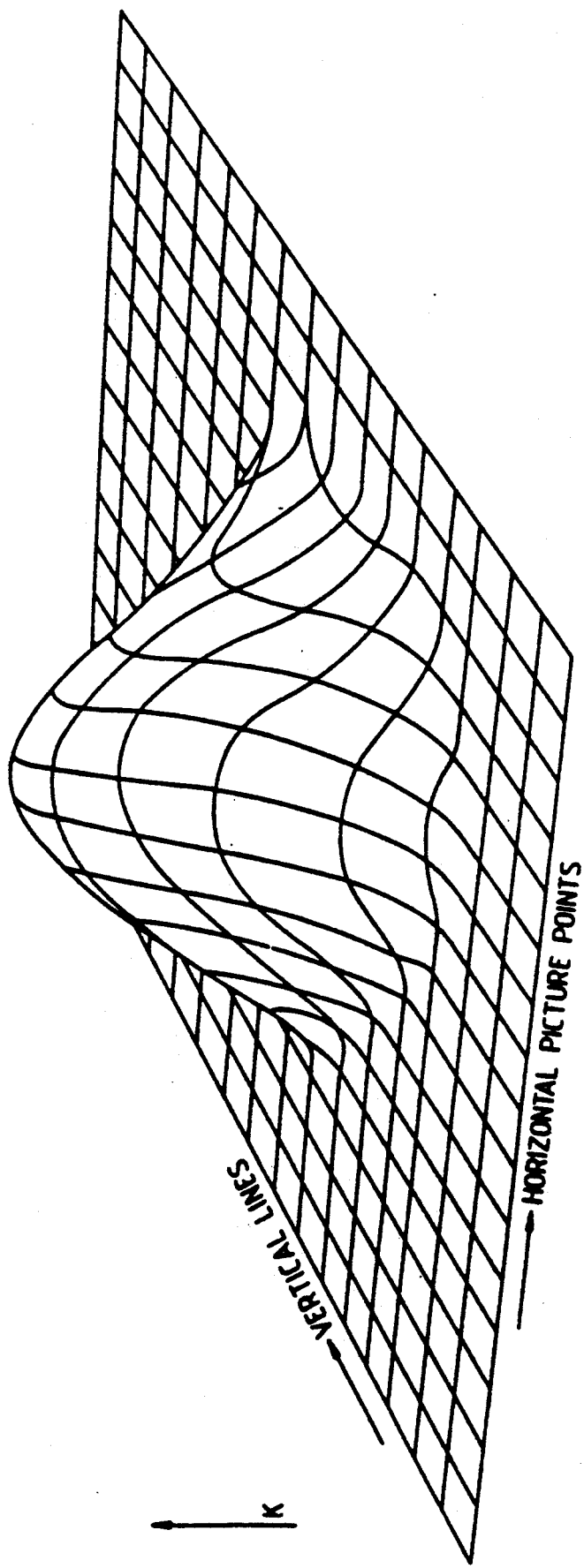
FIG. 4 shows another example from a more pointed pencil.

The contribution (K) for the pencil in FIGS. 3 and 4 is complemented by the contribution supplied by the background, which background may be the paper or the pencilled image already laid down. In other words, as the contribution from the pencil decreases, the contribution from the background increases and vice versa. Thus information on this background must therefore be made available during image synthesis.

In the situation where the shape is calculated from a cylinder, as mentioned above, this in practice produces a sharp pencil like result when handled by the raster display The uniform 'height' of the unquantized cylinder chosen effectively defines the contribution value (K).

Figure 5:
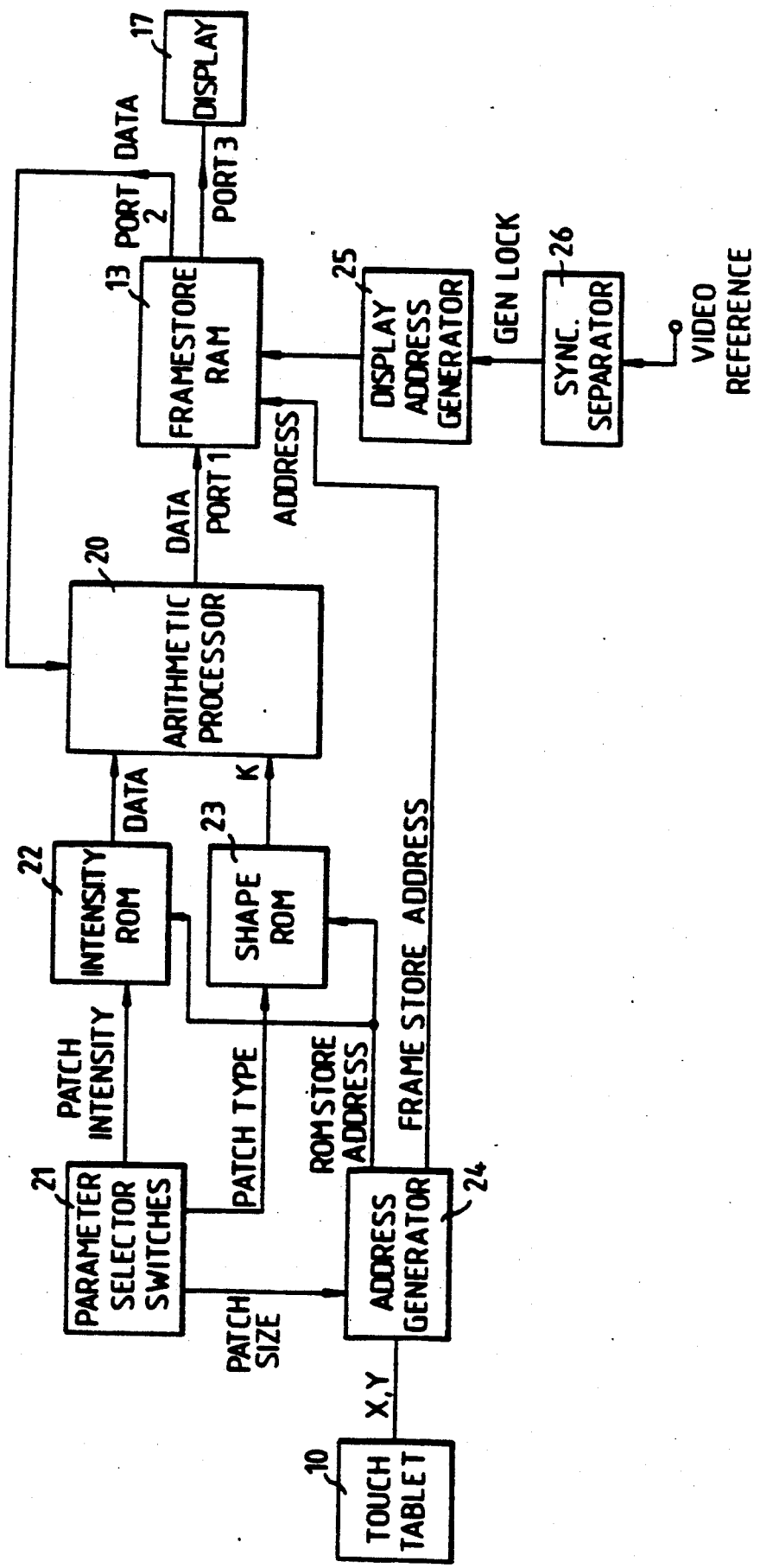
FIG. 5 shows one embodiment of the system of the present invention.

One arrangement for producing the image creation system of the invention is shown in FIG. 5. In order to simplify understanding of the operation, the system will be described initially as operating in black and white (monochrome) so that only variation in intensity will be considered. Colour operation is discussed in more detail later.

The touch tablet 10 is provided as before with its associated stylus and the x and y coordinates fed to address generator 24. The desired implement is expediently selected by means of the switches 21.

These switches can take the form of standard digital thumbwheel switches for example, so that setting to a particular number gives an output indicative of the chosen implement and colour (or intensity in the monochrome case) from those available to the user. Examples of typical implement shapes have been illustrated in FIGS. 3 and 4 and these would be pre-stored in ROM store 23 and the selected item made available therefrom on a picture point by picture point basis by means of the address generator 24. This store 23 effectively gives the value of K for any given picture point within the selected patch. A similar operation occurs also for the intensity value selected from those available within ROM store 22 (see also the schematic illustration of FIG. 6).

The distribution data for the contribution coefficient K for a given implement with values corresponding for example to those shown in FIGS. 3 and 4 read out from the shape ROM 23 will thus vary picture point by picture point in this predetermined manner. In addition intensity data will be read out from ROM 22 for processing by processor 20. The size of the area of interest for a given implement is expediently passed to the address generator 24 as shown to ensure that the number of picture points processed adjacent a given coordinate is kept to a minimum to ensure maximum processing speed.

The processor 20 not only receives data from ROM22 but also from frame store 13 which processor uses a portion of the new data with previously stored data, the proportion being determined by the value of K at any given time. The desired (read) addresses from the frame store are accessed by means of the address generator 24 as are the addresses in which the processed data is to be stored. Thus the information not only flows as simulated to the store (as in the prior art case) but flows from the store for processing which may be termed as a "read-modify-write" process. Whilst the picture build up is continuing, the progress is continuously available to monitor 17 by using a three port frame store arrangement as shown which includes a separate display address generator 25 for sequentially addressing the framestore 13 to gain access to the stored data for monitoring. The address generator 25 is shown under the control of sync separator 26 which receives information from a video reference source in normal manner. Thus framestore 13 allows access for processing so as to read and write to every point essentially at random and a video output port that can display the contents of the frame store at video rates.

Figure 6:
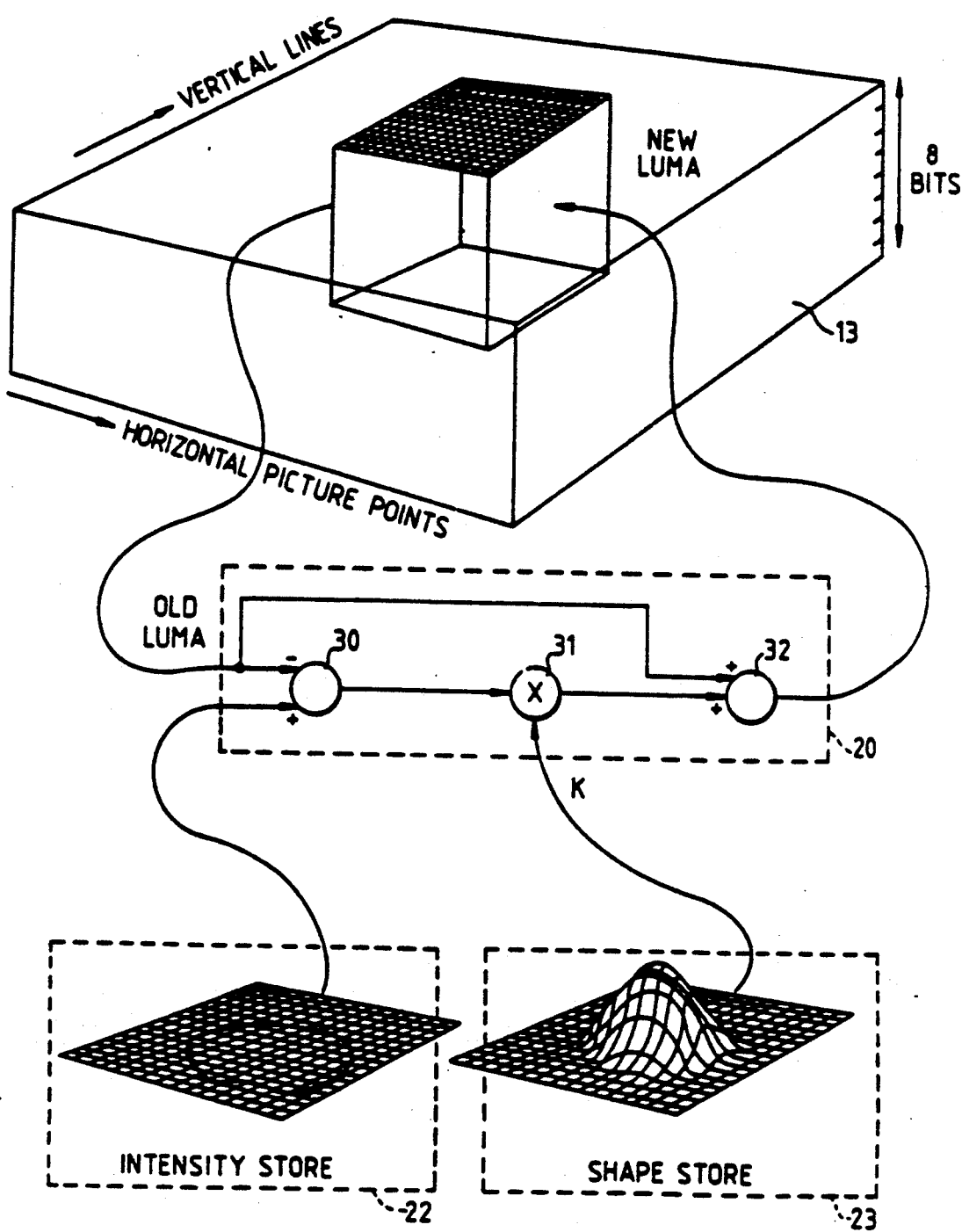
FIG. 6 shows an example of the operation of the processor of FIG. 5.

An example of the arithmetic processing of the data is illustrated in FIG. 6. The pen "shape" distribution and the intensity are shown schematically coming from stores 23 and 22 respectively. There is, of course, no reason why, in the electronic case, the intensity (or in the expanded colour system, the colour) has to be constant across the brush and thus the pen colour or intensity data stored takes on similar proportions to the pen shape data stored.

The algorithm for filling the picture store 13 contents as the stylus is moved is:

$$LUMA_{(NEW)} = K \cdot P_L + (1 - K) \times LUMA_{OLD}$$
$$= K \cdot (P_L - LUMA_{OLD}) + LUMA_{OLD}$$

where $K \leq 1$ and represents the contribution on a point by point basis of the pen shape.

$P_L$ is the Pen intensity and represents a value of Luminance. LUMA is the picture store content This algorithm is realised by the processor 20.

The patch of 16×16 pixels is shown to be large enough to encompass the desired pen shape. The processor hardware for handling this particular algorithm comprises a subtractor 30 (e.g. 74S381), a multiplier 31 (e.g. MPY-8HuJ/TRW) and an adder 32 (e.g. 74S381). The peak of the pen shape is central of the patch in this instance and will produce the maximum value of K at this point. The x and y coordinate provided by the touch tablet will correspond to the corner of the patch read out from the store and processing of all points within this patch is effected and the modified data written back into the store 13. During this processing the old luminance value and the designated intensity value are subtracted and the difference multiplied by coefficient K, the value of K being dependent on where the particular picture point lies within the selected patch. The result is added to the earlier luminance data. It is clear that some picture points at the periphery will remain unchanged in this example. Movement of the actual stylus on the touch pad by one picture point will cause a new patch to be read out from the store 13 which will contain most of the earlier picture points but 16 new picture points will be present and naturally 16 others will have been omitted. The processing will again be carried out for the entire patch. During a particular drawing sequence there will usually be no change in the contents of stores 22 and 23, but the patch from frame store 13 will be changing in dependence on the movement of the stylus. It can be seen that during the second processing operation just described, the previous movement by 1 picture point will cause a proportion of the luminance information generated by the earlier processing operation to be used in the calculation of the new content for the updated patch.

The processor 20 is realised in purpose-built hardware to enable the processing speeds to be achieved in a sufficiently short space of time to provide the real time operational requirements which are beyond normal computational speeds.

The number of processing steps for a given coordinate will depend on the size of the patch accessed.

Thus, if the patch was say 32 picture points wide and 32 high there are 32×32 or 1024 points to be processed for each movement of the stylus. A reasonable update rate for the stylus would be 500 times per second or better and this figure results in a processing speed of approximately 2 μsec per point.

The size of the patch or square of pixels removed from the main picture store 13 must be the same size as that accessed from the pen intensity and the pen shape stores 22 and 23. Thus the latter stores only have a capacity of a few picture points wide and high for any given pen intensity and shape.

Figure 7:
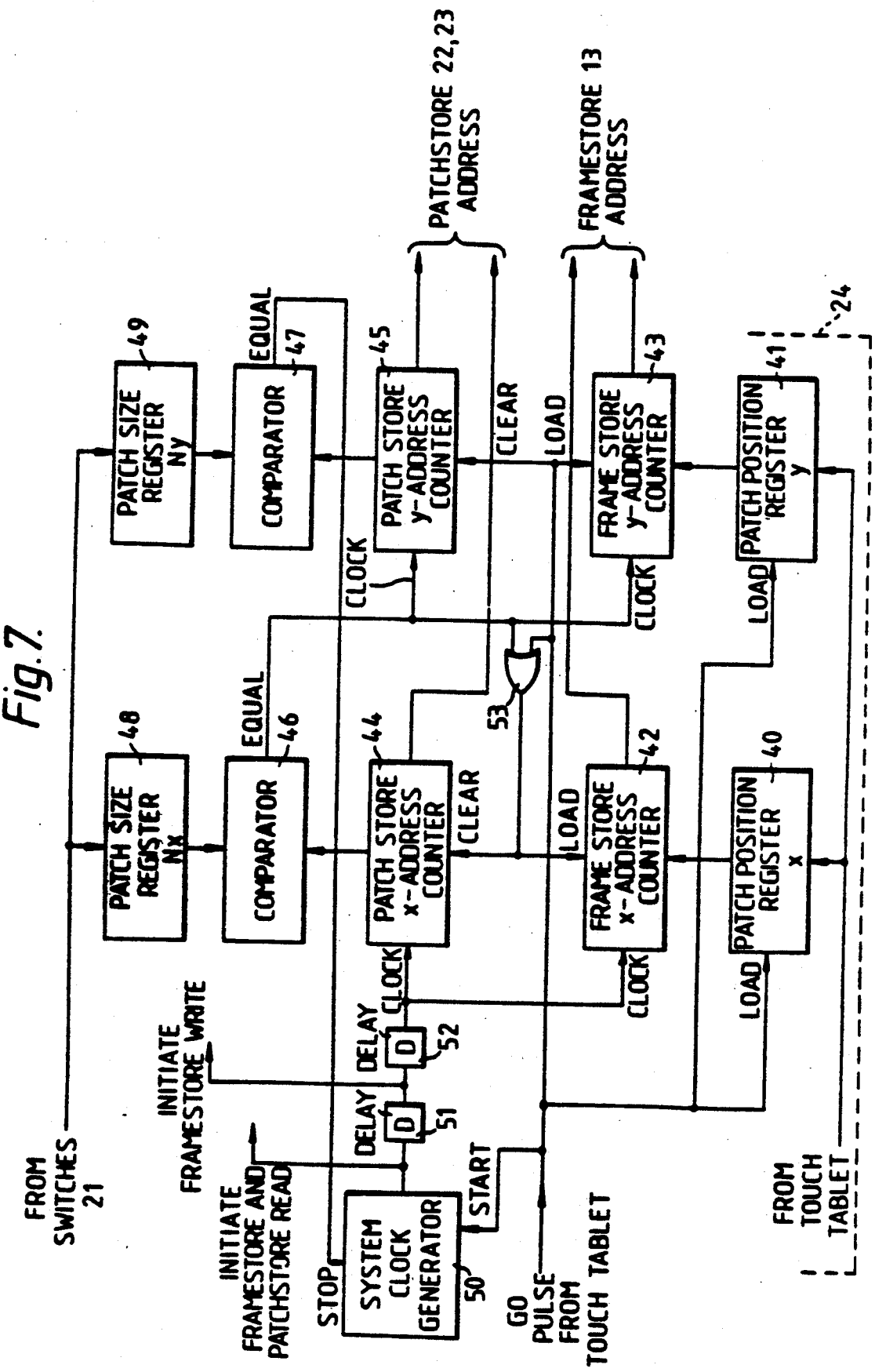
FIG. 7 shows the store addressing operation in more detail.

The patch size can be made variable dependent on requirements as already described with regard to FIG. 5 and the address generator 24 thereof operates to select the desired location accordingly. An embodiment of this address generator will now be described with reference to FIG. 7.

A system clock generator 50 in conjunction with the normal 'go' pulses resulting from the stylus contact with the touch tablet, control the addressing operation for processing. A 'go' pulse from the touch tablet loads the x and y coordinates therefrom into registers 40 and 41. These values are passed across for loading into the x and y frame store address counters 42, 43 to define the start of the addressing within the given patch at the same time the two patch store address counters 44 and 45 are cleared (counter 42 being loaded and counter 44 being cleared respectively via OR gate 53). The go pulse from the touch tablet also initiates the clock generator 50 which produces pulses at a repetition rate sufficiently spaced to allow the processing within the processor 20 of FIG. 5 to be effected before the next pulse is produced (e.g. 500 μS). Thus the first pulse from generator 50 passes to initiate a read operation from frame store 13 and patch stores 22 and 23 at an address defined by the outputs of counters 42, 43 and 44, 45 respectively and schematically represented in FIG. 6. A delay 51 is provided to allow sufficient time for the read operation and the processor 20 to process the data from the first pixel location within the patch with the intensity data and associated contribution value before a write pulse is produced to initiate writing of the processed data back to the frame store 13 so as to effect the 'read-modify-write' sequence. A further delay 52 is provided to allow time for the writing operation to be completed before the clock pulse passes to increment the addresses within the framestore x address counter 42 and the patch address counter 44 for the next cycle. The x and y size of the patch selected by switches 21 of FIG. 5 is held in the registers 48 and 49 respectively. These values are passed to comparators 46 and 47 respectively so that the current count within counters 44 and 45 can be compared to determine when the desired patch has been fully addressed. Thus after a given number of clock pulses equal to the number of pixels in the x direction for a patch (Nx) when the output from patch address counter 44 becomes equal to that from ROM 48, the output of comparator 46 will change causing patch counter 44 to be cleared and frame store x address counter 42 to be reloaded with the x ordinate from register 40. At the same time the frame store y address counter 43 and patch store y address counter 45 are incremented so that all the pixels in the x direction in that patch are addressed, processed and rewritten into the frame store for the next y location in the patch. These steps continue until eventually the y address count within counter 45 will become equal to that output from ROM 49 and this will be detected by comparator 47 indicative that all the pixels within the patch have been processed. This equality causes the stopping of clock generator 50.

When the stylus is moved to the next adjacent x, y coordinate this value will be available at the inputs to registers 40 and 41 and the accompanying go pulse will cause the whole operational cycle to proceed once again, this time for a patch moved by one pixel in either the x or y direction dependent on how the stylus was moved.

By using dedicated hardware for the processing it is possible to read, process and rewrite a patch of 16×16 pixels in only 350 μs approximately which is sufficiently rapid to follow normal stylus movements without fears of falling behind in the processing.

Thus due to the speed of processing, the system will respond seemingly instantaneously for all brushes or other artists implements up to the largest. For very large brushes a patch of 16×16 or even of 32×32 is too small and either larger patches or multiple writing has to be considered and this causes a slowing of the action. However, the larger the brush the slower the action is not dissimilar to working with a real life brush and is, therefore, quite acceptable. In order that this slowing up of the brush does not happen in unnatural steps the size of the patch is made only as large as is necessary for the brush being used and will track the change in size as required.

Although the picture point data is shown in store 13 of FIG. 6 as being defined to 8 bit resolution, in practice increasing the resolution to up to 16 bits will result in a picture of higher quality being obtained. If this refinement is required. The bit handling capacity of the stores and processing will accordingly require expansion.

Although the resolution of the raster display is only 512×768 pixels, for instance, to enhance quality, the pen position (x and y) is preferably known to say an accuracy of 8 times this value (i.e. to 150th of a pixel in each direction). The cylinder shape described above for example can in practice be placed upon the pixel matrix to an accuracy of ⅛th pixel as the touch tablet is inherently capable of defining the stylus coordinates to such accuracy. Thus 64 (i.e. 8×8) placements of the cylinder each resulting in a different brush shape can be stored in store 23 and the appropriate one used dependent on the fractional parts of the coordinate given by the touch tablet and therefor results in an effective brush position accuracy of 8 times better than the original pixel matrix. The patch store capacity and that of the address generator will require adjustment accordingly.

The brushes and pencils described so far have no temporal nature, if the stylus is held steady over a point, nothing additional happens with time. However, in the case of the airbrush the longer it is held over a point the greater the build up of paint. This modification can simply be applied to the algorithm of FIG. 6 by choosing a touch tablet/stylus combination which produces a pulse train whilst held at a given coordinate location (rather than the single 'go' pulse as discussed above). This allows the train of go pulses to each initiate the 'read-modify-write' operation described in relation to FIG. 7.

Figure 8:
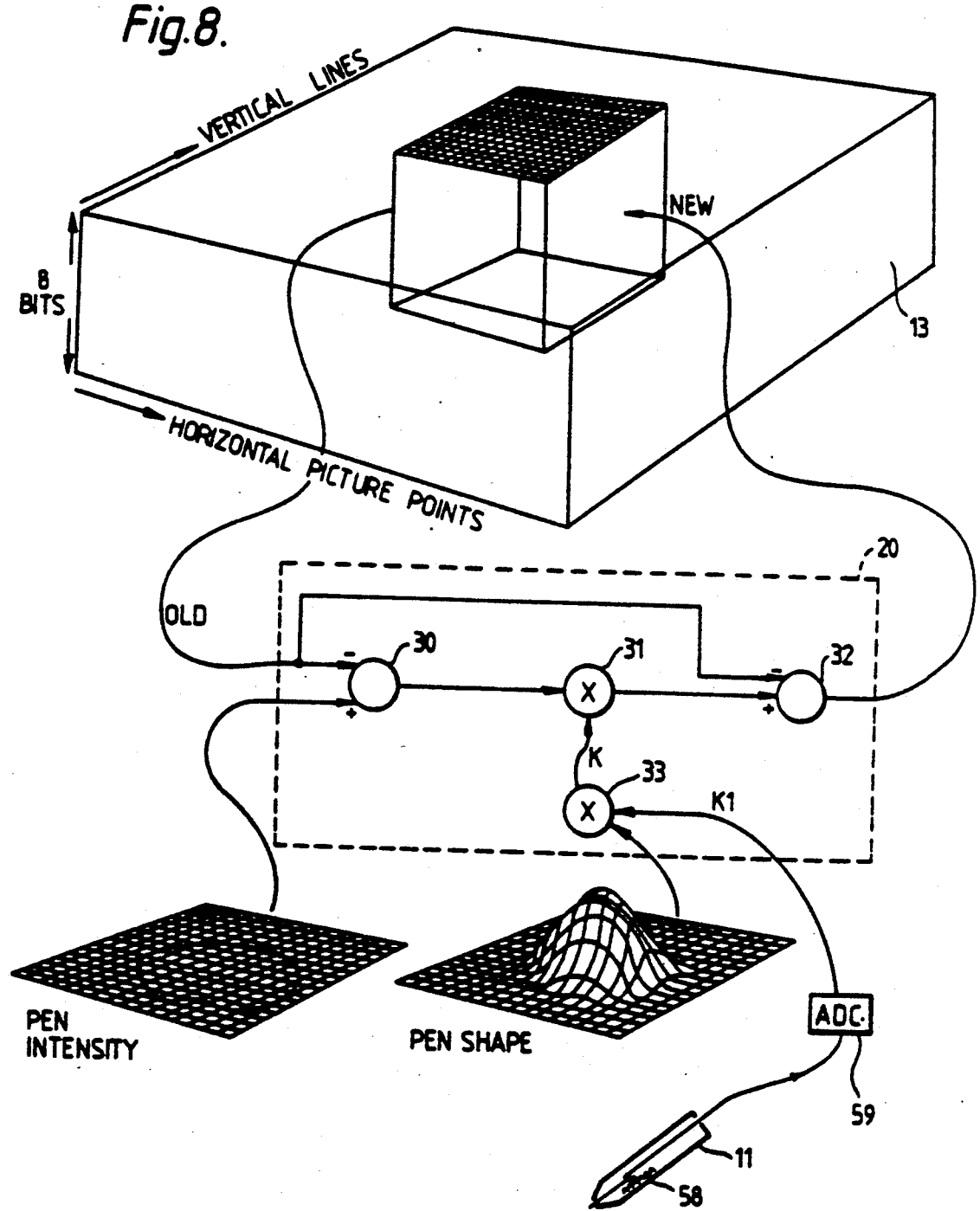
FIG. 8 shows an alternative processing operation to that of FIG. 6.

The system can be made to simulate even more realistically by adding the dimension of "pressure". The texture of the artists tool changes with pressure and thus if a pressure sensitive device were fitted to the point of the stylus then this could be taken into account when setting the pen shape stores. Alternatively, a second multiplier can be added to the standard algorithm between the pen shape store and the processor as now shown in FIG. 8 with additional multiplier 33. The stylus 11 is shown schematically with an integral spring loaded potentiometer 58 which includes a wiper contact which will produce a voltage Vp dependent on the tip pressure. This voltage is converted via ADC 59 to the value $k_1$. Thus if little pressure is being used coefficient $k_1$ is small and if high pressure is employed, K tends to 1.

Figure 9:
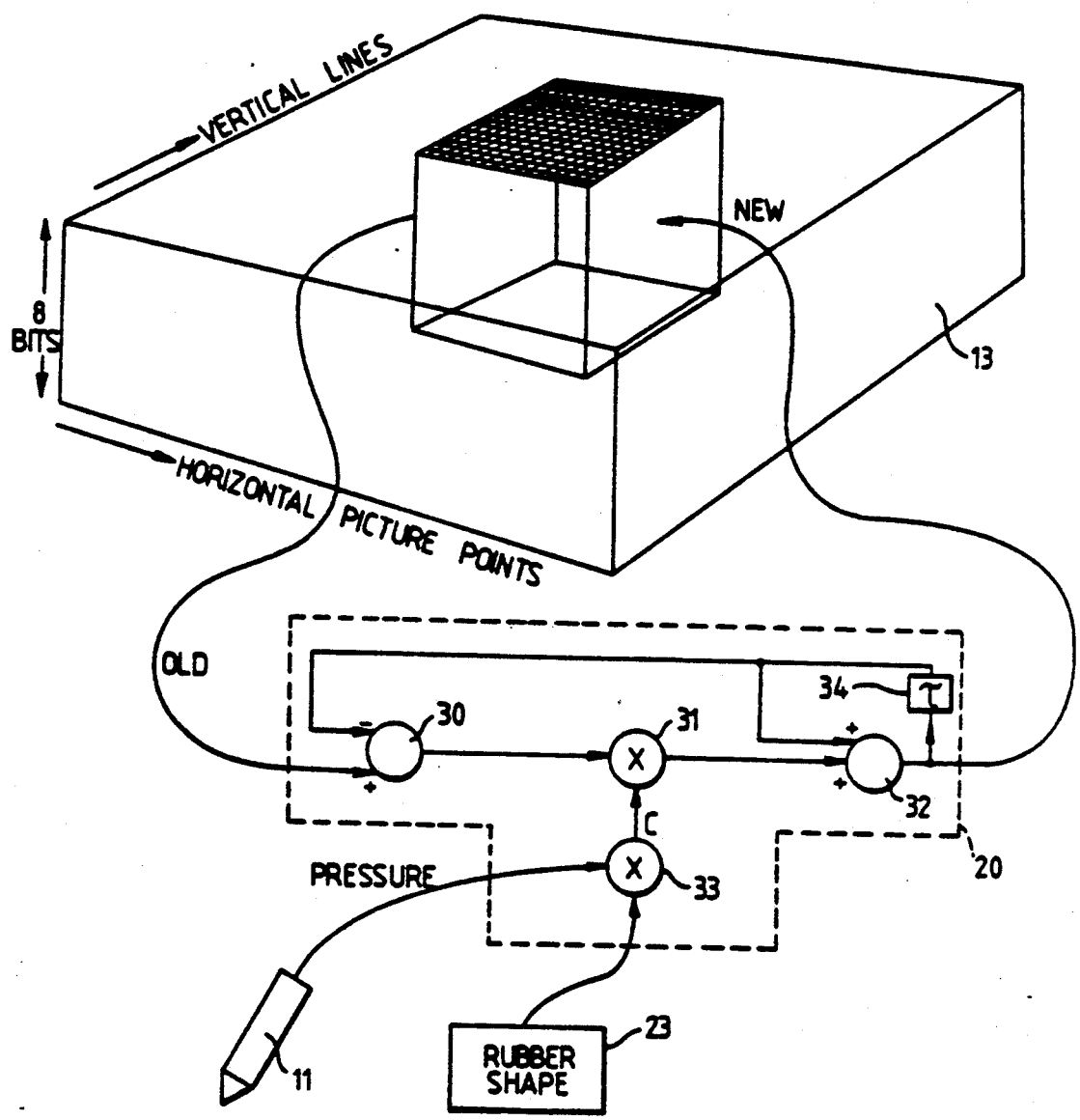
FIG. 9 shows a further alternative processing function.

A further refinement of the machine is to simulate the action of a light rubber or, in the water colour case, clear water by allowing a blurring facility. This can be achieved by modifying the processor of FIG. 6 to operate as an accumulator to allow recursive low pass filtering on the patch as shown in FIG. 9. This allows a contribution from adjacent picture points within the patch to be provided when calculating the intensity of a particular picture point.

The processor 20 includes subtractor 30, multiplier 31 and adder 32 as before. The old data is received by subtractor 30 where delayed data from delay 34 is subtracted therefrom. The result is multiplied by coefficient C in multiplier 31. The output from the multiplier is added in adder 32 to the delayed data from delay 34. The hardware of this processor acts as the desired accumulator with the value of C determining the degree of smearing. If the delay period $\tau$ is selected to equal 1 picture point then horizontal smearing takes place. If $\tau$ equals 16 picture points then vertical smearing takes place. This delay can be selected using thumbwheel switches for example. As shown the value of C can, if desired, be variable in regard to both the shape of the rubber say (made available from store 23) and the pressure of application of the rubber (made available from stylus 11) by using the further multiplier 33. p Although the distributions of FIGS. 3 and 4 are somewhat symmetrical, with other configurations this need not be so. Thus for a stipple brush for example, a number of peaks will be present.

Figure 10:
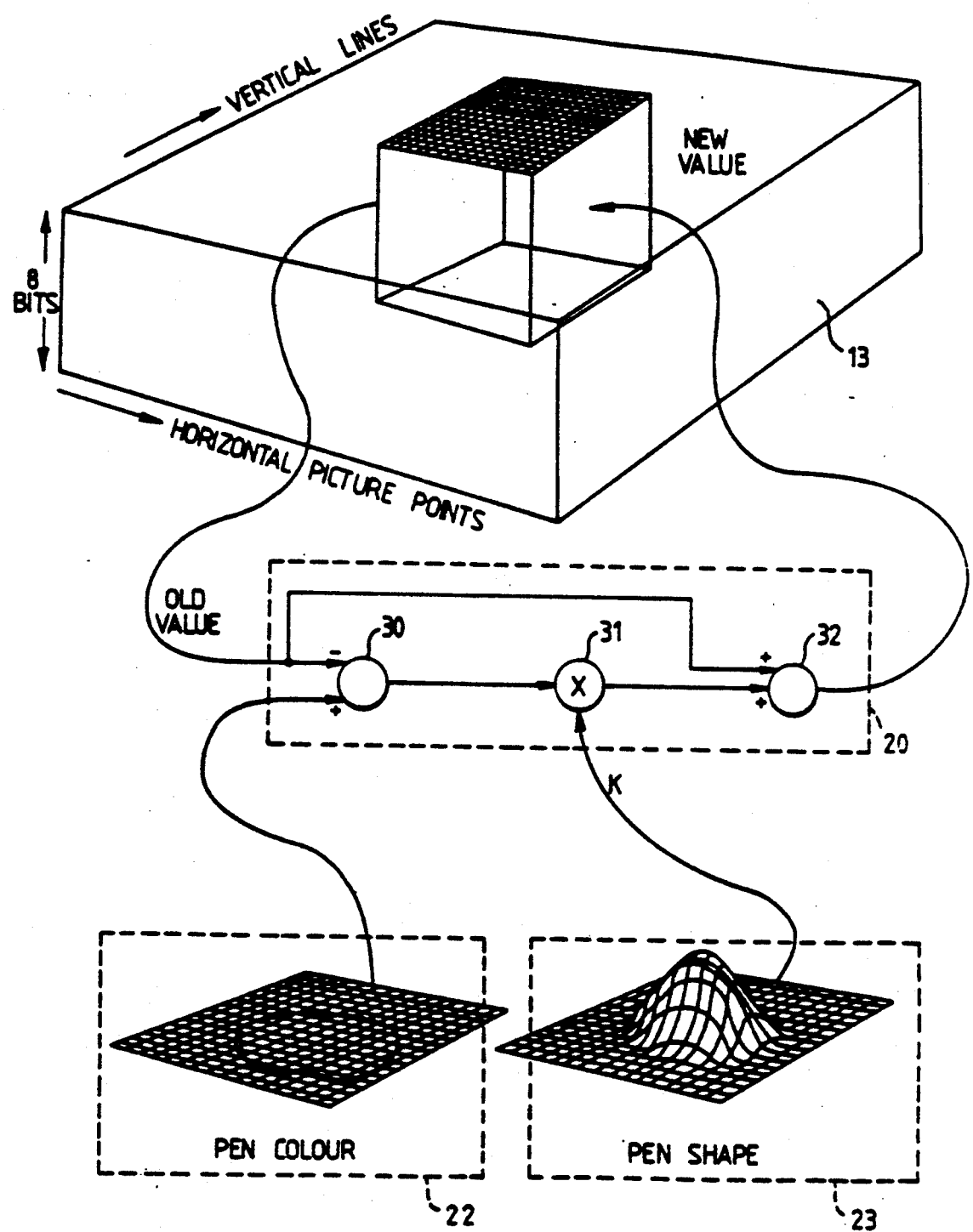
FIG. 10 shows a configuration employed for a partial colour system.

Although the system has been described for ease of explanation as achieving a monochrome operation, in practice the system would adapt to generate colour images. A first step would be to provide a 'partial colour' system using memories along the lines of FIG. 1. In such a situation the processing requirement is shown in FIG. 10. The intensity values used from store 22 are now defined as colour values and processed values derived therefrom will be converted into actual colour values on read out from the frame store (as in FIG. 1).

There is of course, no reason why, in the electronic case, the colour has to be constant across the brush and thus the pen colour store can take on similar proportions to the pen shape store.

Thus, the algorithm for filling the picture store contents as the stylus is moved is now:

$$\text{VALUE}_{new} = K \cdot P_c + (1-K) \times \text{VALUE}_{old}$$

Where $K<1$ and represents the contribution on a point by point basis of the pen shape.

$P_c$ is the Pen colour and represents a value of Hue, Saturation and Luminance.

VALUE is the picture store content for that particular picture point.

With a partial colour system, difficulties can arise since 'intensity' produced by the algorithm may appear as 'colour' incorrectly. Special luminance values must be 'reversed' to avoid this degradation.

Figure 11:
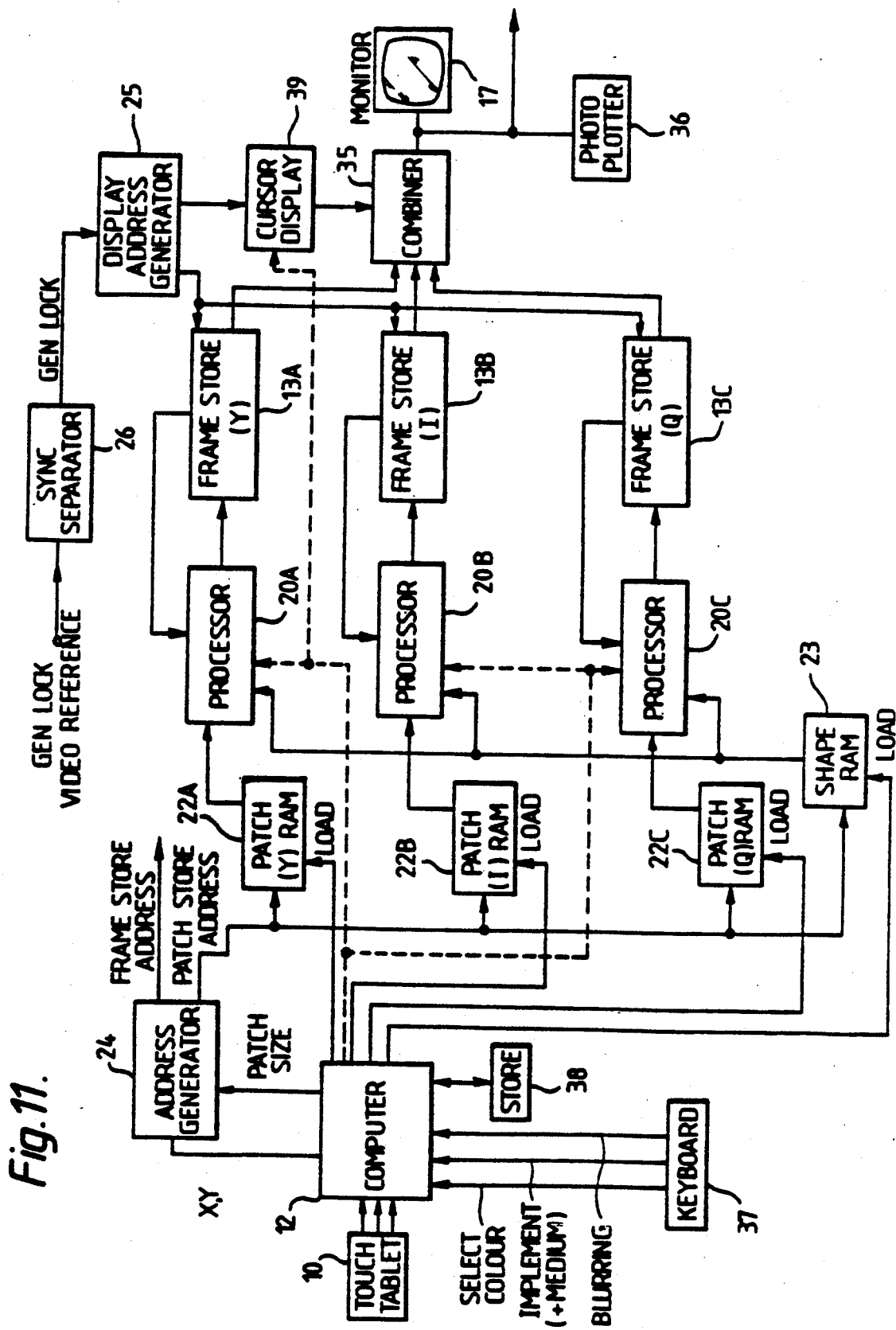
FIG. 11 shows an expanded arrangement capable of providing full colour processing.

In order to provide a full range of hues, saturations and luminance levels however a system with three frame stores and associated processing would be preferable as shown in FIG. 11. These would handle the luminance and colour difference (i.e. Y, I and Q) components respectively.

Thus three frame stores 13A-13C are shown with associated processors 20A-20C, for the respective Y, I and Q components.

The processed data held in the various frame stores is passed to combiner 35 where the luminance and colour difference information is combined to provide full colour video for the monitor 17. The read and write addressing respectively of the frame stores will be common to each store and is supplied by address generator 24 as before. The patch store addressing will be common to the patch stores 22A-22C and 23. As now shown in FIG. 11 where there is a number of selections for the various parameters it is convenient (as an alternative) to replace the switches 21 of FIG. 5 with the computer 12. Thus a given colour or implement for example can be selected on the computer keyboard 37. By using RAMs instead of ROMs for the patch stores 22, 23 allows a greater number of variations to be conveniently dealt with, as any one of a number of colours or shapes stored in bulk computer store 38 can on operating the keyboard 37 be loaded via computer 12 into the designated RAM. Thereafter the stores 22, 23 are effectively used as a ROM until a new colour or shape is selected, at which time the RAMs are written into with updated parameters. The storage capacities of the stores 22, 23 need only be equivalent to the maximum brush size required (defined to pixel or sub-pixel accuracy). The patch size and x, y coordinates can also be passed via the computer. Time information from the touch tablet and pressure information from the stylus for example can also be passed conveniently via computer 12 to the processors 20A-20C as represented by the broken lines.

As the computer is only being used for switching and routing operations as an optional alternative to the thumbwheel switch configuration described earlier and not for processing, its speed limitation is not a problem in the present system.

As shown a cursor display block 39 may be included to indicate, on the monitor 17, the position of the stylus. The cursor block may include an offset device controlled by the patch size information available via the computer so that the cursor is offset to indicate the centre rather than the corner of the patch.

The system described is not restricted to use in the broadcasting art alone. After completion of the creation process the image may be converted into hard copy for example using the photoplotter 36 so that it can be used as normal artwork for magazines and so on.

With the addition of other peripherals (e.g. modem) the image could be directly relayed to remote locations or recorded onto disc for transportation to a remote location or for future use.

Thus a full range of options are open to the operator and are shown as inputs to computer 12 and include colour selection, implement and medium, pressure, time of application (for airbrush etc) and blurring of the eraser or water colour simulation. It has been found that the system produces extremely good artistic results.

Although the system has been described as using a touch tablet, other possibilities exist for generating the x and y coordinates.

The algorithms described above may alternatively be generated by a rapidly operating dedicated microprocessor, although this may result in some loss of computational speed.

Although the FIG. 11 arrangement has been described generally in terms of NTSC colour components, it can equally apply to PAL colour components or RGB.

We claim:

1. A video image creation system comprising:
   manually operable means for designating variable coordinate locations under manual control;
   means for providing current image data pertaining to a patch of picture points allocated to a designated coordinate location; and
   processing means for processing the image for each picture point allocated to a designated coordinate location from both current and previously derived image data to derive new image data for the respective picture point comprising proportions of said current and said previously derived image data;
   generator means for generating a parameter which determines the proportions of current and previously derived image data processed by said processing means and which is varied on a picture point by picture point basis so that the proportion of current image data relative to previously derived image data at each picture point in the patch corresponds to the projection on said picture point of the appropriate portion of a continuous three dimensional shape representing the distribution around the center of a notional artist's implement the placement of which is determined by said designated coordinate location, the said shape having a high central region and decreasing from said region to the edge of the shape.

2. A system as in claim 1 in which said high central region of said continuous three dimensional shape is flat and said parameter is varied on a picture point by picture point basis only at a peripheral portion of said patch.

3. A system as in claim 1 including a source of a blend control signal, wherein said brush processor includes a subsystem responsive to said blend control signal to blend said brush data and said image data in proportions related to said blend control signal.

4. A system as in claim 3, including frame storage means for storing previously derived data for use by the processing means and for storing new data following processing by the processing means.

5. A system as in claim 4, including monitoring means for observing the image creation via the frame storage means.

6. A system as in claim 5, wherein said manually operable means designates coordinate locations to a higher resolution than the resolution of picture points, and wherein the generator means is adapted to provide a parameter variable on a picture point by picture point basis for picture points in the patch depending on the placement of the notional artist's implement as determined by the designated coordinate location with reference to said picture points to an accuracy of a fractional part of a picture point.

7. A system as in claim 6, wherein the generator means includes a memory loaded with said parameter values, and including addressing means for addressing said memory to read said parameter values therefrom.

8. A system as in claim 7, wherein the addressing means is adapted to address a number of storage locations corresponding to the number of picture points allocated to a designated coordinate location.

9. A video image creation system comprising manually operable means for designating coordinate locations under manual control to allow creation of the image to be affected substantially in real time, means for providing current image data pertaining to at least one picture point allocated to a designated coordinate location and processing means for processing the image for each picture point allocated to a designated coordinate location from both current and previously derived image data, and generator means for generating a parameter for determining the proportions of current and previously derived image data processed by said processing means, wherein the generator means is adapted to provide a parameter dependent on manual pressure applied to an artist's implement related to said manually operable means to vary the proportion of current data used for processing.

10. A system as in claim 9, wherein the processing means comprises an arithmetic processor.

11. A system as in claim 10, wherein the arithmetic processor includes at least one adder, subtractor and multiplier.

12. A system as in claim 11, wherein the means for providing current image data is adapted to output data pertaining to picture intensity.

13. A system as in claim 12, wherein the means for providing current image data is adapted to output data pertaining to picture color.

14. A system as in claim 13, wherein the means for providing current image data comprises a plurality of memories at least some of which have an output dependent on image color.

15. A system as in claim 14, wherein separate processing means are provided for each of the current image data memories.

16. A system as in claim 15, wherein separate frame storage means are provided for said previously derived image data respectively cooperating with each of the processing means.

17. A system as in claim 16, wherein printing means are provided for providing a hard copy of the created image.

18. A method comprising:
designating variable coordinate locations under manual control;
providing current image data from digital computing circuits for a number of picture points forming a patch of picture points allocated to a designated coordinate location;
using digital computing circuits to process the image for each picture point allocated to a designated coordinate location from both current and previously derived image data to derive new image data for the respective picture point comprising proportions of said current and said previously derived image data; and
using digital computing circuits to generate a parameter which determines the proportions of current and previously derived image data processed by said processing step and which is varied on a picture point by picture point basis for the picture points forming at least a peripheral part of said patch so that the proportion of current image data relative to previously derived image data at picture points forming the patch corresponds to the relative distribution of a notional artist's implement the placement of which is determined by said designated coordinate location, said distribution being high in a central region of said patch and progressively decreasing from said central region to the edge of the patch.

19. A method as in claim 18, in which said step of providing variable coordinate locations under manual control comprises providing said coordinate locations to allow creation of the image to be affected substantially in real time wherein, for simulating brushes and pencils having no temporal nature, said manual control step is such that if a manually operable means is held on a location no additional processing occurs with time after the processing initiated upon the a designation of that location and, for simulating air brush, said manual control step is such that if said manually operable means is held on location a train of processing operations is initiated.

20. A method as in claim 18, including using at least one frame store to store previously derived data for use by the processing step and to store new data following processing by the processing step to thereby facilitate the creation of an image by said processing step.

21. A method as in claim 18, wherein the said step of designating coordinate locations designates coordinate locations to a higher resolution than the resolution of picture points, and wherein the generating step is adapted to provide a parameter variable on a picture point by picture point basis for picture points forming the patch depending on the placement of the notional artist's implement as determined by the designated coordinate location with reference to said picture points to an accuracy of a fractional part of a picture point.

22. A method as in claim 18 in which said parameter is substantially constant in said high central region.

23. A system comprising:
a store for image data defining an image;
an operator controlled device for drawing a continuous stroke designating a succession of positions defining a stroke in said image;
a source of brush data; and
a brush processor responsive to each designation of a position in the image to blend the brush data with image data from the store related to the designated position and to store the blend in place of the image data used in the blend;
wherein the image data used in a blend in response to a given designated position comprise image data that resulted from a blend in response to previously designated positions in the stroke.

24. A system as in claim 23 including a source of a blend control signal, wherein said brush processor includes a subsystem responsive to said blend control signal to blend said brush data and said image data in proportions related to said blend control signal.

25. A system as in claim 24, in which said image data stored in said stored in said store comprise pixel data, said brush processor blends the brush data with pixel data from pixels within a circular patch of said image, the location of which is determined by the designated position, and said blend control signal comprises respective blend control values for the respective pixels in said patch.

26. A system as in claim 24 in which said brush processor is selectively operable in a first mode in which the processor blends only in response to a new designation which is spaced in distance along the stroke from the previous designation or in a second mode in which the processor blends in response to a new designation which is spaced in time from the previous designation, whether or not it is spaced also in distance.

27. A system as claimed in claim 26, in which said image data stored in said store comprise pixel data, said brush processor blends the brush data with pixel data from pixels within a circular patch of said image, the location of which is determined by the designated position, and said blend control signal comprises respective blend control values for the respective pixels in said patch.

28. A system as in claim 27, in which said device designates positions at pixel spacing in an artist designated stroke, and said brush processor operates substantially in real time to allow for a display of the image data from the store in a manner showing the results of the blending substantially in real time.

29. A system as in claim 27 in which said image data stored in said store comprise pixel data and said device for designating image positions comprises a device for designating image positions to a spatial resolution greater than the pixel resolution of said pixel data such that a designated position comprises a sub-pixel fraction, and selecting blend control signals in dependence upon the sub-pixel fraction comprised in the designated position.

30. A system as in claim 29 in which said device designates positions at pixel spacing in an artist designated stroke, and said brush processor operates substantially in real time to allow for a display of the image data from the store in a manner showing the results of the blending substantially in real time.

31. A system as in claim 26 in which said device designates positions at pixel spacing in an artist designated stroke, and said brush processor operates substantially in real time to allow for a display of the image data from the store in a manner showing the results of the blending substantially in real time.

32. A system as in claim 24, in which said device designates positions at pixel spacing in an artist designated stroke, and said brush processor operates substantially in real time to allow for a display of the image data from the store in a manner showing the results of the blending substantially in real time.

33. A system as in claim 32 in which said image data stored in said store comprise pixel data and said device for designating image positions comprises a device for designating image positions to a spatial resolution greater than the pixel resolution of said pixel data such that a designated position comprises a sub-pixel fraction, and selecting blend control signals in dependence upon the sub-pixel fraction comprised in the designated position.

34. A system as in claim 24 in which said source of brush data supplies brush data for picture points which are in a circular area and said source of a blend control signal supplies a blend control signal which varies at least within a peripheral annulus of said circular area.

35. A system as in claim 34 in which the blend control signal varies only within said annulus of said circular area.

36. A system as in claim 23 in which said brush processor is selectively operable in a first mode in which the processor blends only in response to a new designation which is spaced in distance along the image from the previous designation or in a second mode in which the processor blends only in response to a new designation which is spaced in time from the previous designation.

37. A system as in claim 36 in which said image data stored in said store comprise pixel data and said device for designating image positions comprises a device for designating image positions to a spatial resolution greater than the pixel resolution of said pixel data such that a designated position comprises a sub-pixel fraction, and selecting blend control signals in dependence upon the sub-pixel fraction comprised in the designated position.

38. A system as in claim 37 in which said device designates positions at pixel spacing in an artist designated stroke, and said brush processor operates substantially in real time to allow for a display of the image data from the store in a manner showing the results of the blending substantially in real time.

39. A system as in claim 36 in which said device designates positions at pixel spacing in an artist designated stroke, and said brush processor operates substantially in real time to allow for a display of the image data from the store in a manner showing the results of the blending substantially in real time.

40. A system as in claim 23 in which said image data stored in said store comprise pixel data and said device for designating image positions comprises a device for designating image positions to a spatial resolution greater than the pixel resolution of said pixel data such that a designated position comprises a sub-pixel fraction, and selecting blend control signals in dependence upon the sub-pixel fraction comprised in the designated position.

41. A system as in claim 40 in which said device designates positions at pixel spacing in an artist designated stroke, and said brush processor operates substantially in real time to allow for a display of the image data from the store in a manner showing the results of the blending substantially in real time.

42. A system as in claim 23 in which said device designates positions at pixel spacing in an artist designated stroke, and said brush processor operates substantially in real time to allow for a display of the image data from the store in a manner showing the results of the blending substantially in real time.

43. A system as in claim 23 in which said device for designating positions in said image comprises a pen and a tablet.

44. A system as in claim 43 in which said pen is pressure sensitive and for each designated position produces a respective blend control signal having a value profile related to manual pressure exerted on the pen at the time, and said brush processor comprises a subsystem responsive to the respective blend control signals for the designated positions to blend said brush data and image data in proportions related to the blend control signal.

45. A system as in claim 23 including a source of a blend control signal comprising a pressure sensitive pen which for each designated position produces a respective blend control signal having a parameter varying as a function of the pressure applied to the pen, said blend control signal being supplied to said brush processor to control the proportions of brush data and image data used to form said blend.

46. A system as in claim 45 in which said image data comprises image data for respective pixels of an image, for each designated position said brush data comprises brush data for a respective patch of said image, and said source of a blend control signal comprises a source of respective blend control values for the pixels of the respective patch of said image, wherein for at least some of the pixels in said patch said blend control values vary from one designated position to another in response to variations in pressure on the pen.

47. A system comprising:
a computer-implemented source of brush data;
a computer-implemented source of image data;
a source of a blend control signal which has a selected parameter derived in response to manual pressure; and
a brush processor blending said brush data with said image data in proportions related to said blend control signal.

48. A system as in claim 47 including an operator controlled device for designating a succession of image positions, and in which said image data define an image and said brush processor blends said brush data with image data from image positions related to image positions designated by said device and said brush processor is selectively operable in a first mode in which the brush processor blends said brush data with image data only in response to a new designation which is spaced in distance along the image from the previous designation or in a second mode in which the processor blends in response to a new designation which is spaced either in distance or in time from the previous designation.

49. A system as in claim 48 in which said source of image data comprises a store which stores the image data in the form of pixel data and stores the data resulting from said blending in place of the image data used in the blending and said device for designating image positions comprises a device for designating image positions to a spatial resolution which is greater than the pixel resolution of said pixel data.

50. A system as in claim 49 in which said device designates positions at pixel spacing in an artist designated stroke, and said brush processor operates substantially in real time to allow for a display of the image data from the store in a manner showing the results of the blending substantially in real time.

51. A system as in claim 48 in which said device designates positions which comprise positions at pixel spacing in an artist designated stroke, and said brush processor operates substantially in real time to allow for a display of the results of the blending substantially in real time.

52. A system as in claim 47 including a device for designating a succession of image positions, wherein said image data define an image and said brush processor blends said brush data with image data from image positions related to image positions designated by said device and said source of image data comprises a store which stores the image data in the form of pixel data and stores the data resulting from said blending in place of the image data used in the blending and said device for designating image positions comprises a device for designating image positions to a spatial resolution greater than the pixel resolution of said pixel data.

53. A system as in claim 52 in which said device designates positions at pixel spacing in an artist designated stroke, and said brush processor operates substantially in real time to allow for a display of the image data from the store in a manner showing the results of the blending substantially in real time.

54. A system as in claim 47 in which said device designates positions which comprise positions at pixel spacing in an artist designated stroke, and said brush processor operates substantially in real time to allow for a display of the results of the blending substantially in real time.

55. A system as in claim 47 in which said source of brush data produces brush data for a first circular area and said source of a blend control signal produces a blend control signal varying such that the proportion of the brush data blended with the image data decreases in moving toward the circumference of the first circular area from a second circular area which is concentric with and smaller that said first circular area.

56. A system comprising:
a store for image data defining an image;
an operator controlled device for designating a succession of image positions;
a source of brush data; and
a brush processor responsive to each designation to blend the brush data with image data from the store related to the designated position;
wherein said brush processor is selectively operable in a first mode in which the processor blends only in response to a new designation which is spaced in distance along the image from the previous designation or in a second mode in which the processor blends in response to a new designation which is spaced in time from the previous designation, whether or not it is spaced also in distance.

57. A system as in claim 56 in which said image data stored in said store comprise pixel data and said device for designating image positions comprises a device for designating image positions to a spatial resolution greater than the pixel resolution of said pixel data such that a designated position comprises a sub-pixel fraction, and selecting blend control signals in dependence upon the sub-pixel fraction comprised in the designated position.

58. A system as in claim 57 in which said device designates positions at pixel spacing in an artist designated stroke, and said brush processor operates substantially in real time to store data resulting from said blending in the store in place of the image data used in the blending substantially in real time to allow for a display of the image data from the store in a manner showing the results of the blending substantially in real time.

59. A system as in claim 56 in which said device designates positions at pixel spacing in an artist designated stroke, and said brush processor operates substantially in real time to store data resulting from said blending in the store in place of the image data used in the blending substantially in real time to allow for a display of the image data from the store in a manner showing the results of the blending substantially in real time.

60. A system comprising:

a store for pixel data defining an image;

a device for designating a succession of image positions to a spatial resolution greater than the pixel resolution, wherein a designated position can comprise a sub-pixel fraction;

a source of brush data; and a brush processor responsive to each designation of an image position to blend the brush data with pixel data from the store related to the designated image position and any sub-pixel fraction of the designated position, and to store the blend in the store in place of the pixel data used in the blend.

61. A system as in claim 60 in which said brush processor operates substantially in real time to allow for a display of the image data from the store in a manner showing the results of the blending at a rate which gives the appearance that the display simultaneously shows a stroke painted across the image by an artist using said device for designating.

62. A system comprising:

a store for image data defining an image;

a device for designating a succession of image positions;

source of brush data; and a processor responsive to each designation to blend the brush data with image data from the store related to the designated position and to store the blend in the store in place of the image data used in the blend;

said processor operating substantially in real time to allow for a display of the image data from the store data in a manner showing the results of the blending at a rate which gives the appearance that the display instantaneously shows a stroke painted across the image by an artist using said device for designating.

63. An image creation system comprising:

a pressure sensitive pen and a tablet generating position information identifying positions which the pen assumes in a continuous stroke on the tablet and pressure information related to pressure on the pen during the stroke;

a source of brush data comprising pixel values for pixels in a patch in which the pixel values rise at least over a selected distance inwardly from the periphery of the patch;

an image store comprising storage for image data comprising pixel values of pixels defining an image;

a processor receiving said position and pressure information and, in response to successive pen positions identified by the position information, carrying out a corresponding succession of processing operations in each of which the processor retrieves from the store image data for pixels at positions in the image identified by the position information, processes the retrieved image data with brush data to combine the image and brush data into processed image data in proportions which depend on the pressure information and stores the processed image data in said store in place of the image data used in the processing operation;

wherein each processing operation after a starting portion of the stroke comprises processing image data resulting from a number of previous processing operation during the stroke; and a raster-scan monitor which receives image data from said store and displays an image corresponding to the received image data.

64. An image creation process comprising the steps of:

moving a pressure sensitive pen on a tablet and generating position information identifying positions which the pen assumes in a continuous stroke on the tablet and pressure information related to a pressure on the pen during the stroke;

providing brush data comprising pixel values for pixels in a patch in which the pixel values rise at least over a selected distance inwardly from the periphery of the patch;

providing an image store comprising storage for image data comprising pixel values of pixels defining an image;

in response to successive pen positions identified by the position information, carrying out a corresponding succession of processing operations in each of which the processor retrieves from the store image data for pixels at positions in the image identified by the position information, processes the retrieved image data with brush data to combine the image and brush data into processed image data in proportions which depend on the pressure information and stores the processed image data in said store in place of the image data used in the processing operation;

wherein each processing operation after an initial portion of the stroke comprises processing image data resulting from a number of previous processing operation during the stroke; and displaying on a raster-scan monitor an image derived from image data in said store.

* * * * *